United States Patent
Yamada

(10) Patent No.: US 11,146,168 B2
(45) Date of Patent: Oct. 12, 2021

(54) SNUBBER CIRCUIT AND POWER CONVERSION APPARATUS

(71) Applicant: FUJI ELECTRIC CO., LTD., Kanagawa (JP)

(72) Inventor: Ryuji Yamada, Hachioji (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 0 days.

(21) Appl. No.: 16/910,102

(22) Filed: Jun. 24, 2020

(65) Prior Publication Data
US 2021/0067031 A1 Mar. 4, 2021

(30) Foreign Application Priority Data
Aug. 29, 2019 (JP) .............................. JP2019-156565

(51) Int. Cl.
*H02M 1/34* (2007.01)
*H02M 7/515* (2007.01)

(52) U.S. Cl.
CPC ............. *H02M 1/34* (2013.01); *H02M 7/515* (2013.01); *H02M 1/348* (2021.05)

(58) Field of Classification Search
CPC .......... H02M 1/32; H02M 1/34; H02M 1/342; H02M 1/344; H02M 1/346; H02M 1/348; H02M 7/06; H02M 7/062; H02M 7/515
See application file for complete search history.

(56) References Cited

U.S. PATENT DOCUMENTS

2020/0295652 A1* 9/2020 Wang .................... H02M 7/003
2021/0067030 A1* 3/2021 Yamada .................. H02M 1/14

FOREIGN PATENT DOCUMENTS

JP 2016144340 A 8/2016

* cited by examiner

*Primary Examiner* — Adolf D Berhane

(57) ABSTRACT

Provided is a snubber circuit comprising N parallel charging paths each having a positive-side capacitor, a first diode, and a negative-side capacitor sequentially connected in series between a positive-side terminal and a negative-side terminal, and configured to conduct current from the positive-side terminal toward the negative-side terminal; (N+1) parallel discharging paths each having a second diode connected between the negative-side terminal or the negative-side capacitor of $k^{th}$ charging path of N charging paths and the positive-side capacitor of $(k+1)^{th}$ charging path of N charging paths or the positive-side terminal, and configured to counduct current from the negative-side terminal toward the positive-side terminal via at least one of the negative-side capacitor and the positive-side capacitor; and at least one auxiliary capacitor each being connected in parallel to at least one of the N first diodes included on N charging paths and (N+1) second diodes included on (N+1) discharging paths.

8 Claims, 15 Drawing Sheets

SNUBBER CIRCUIT AND POWER CONVERSION APPARATUS

The contents of the following Japanese patent application (s) are incorporated herein by reference: 2019-156565 filed in JP on Aug. 29, 2019.

BACKGROUND

1. Technical Field

The present invention relates to a snubber circuit and a power conversion apparatus.

2. Related Art

In the related art, a variety of technologies for preventing element breakdown due to a surge voltage are suggested (for example, refer to Patent Document 1).
Patent Document 1: Japanese Patent Application Publication No. 2016-144340

In recent years, it is needed to effectively reduce the surge voltage, in association with an increase in current of a semiconductor module.

SUMMARY

In order to solve the above problem, a first aspect of the present invention provides a snubber circuit. The snubber circuit may comprise N (N: integer equal to or greater than 1) parallel charging paths each having a positive-side capacitor, a first diode, and a negative-side capacitor sequentially connected in series between a positive-side terminal and a negative-side terminal, and configured to cause current to flow from a side of the positive-side terminal toward a side of the negative-side terminal. The snubber circuit may comprise (N+1) parallel discharging paths each having a second diode connected between the negative-side terminal or the negative-side capacitor of a $k^{th}$ charging path (k: integer equal to or greater than 0 and smaller than N) of the N charging paths and the positive-side capacitor of a $(k+1)^{th}$ charging path of the N charging paths or the positive-side terminal, and configured to cause current to flow from the side of the negative-side terminal toward the side of the positive-side terminal via at least one of the negative-side capacitor and the positive-side capacitor. The snubber circuit may comprise at least one auxiliary capacitor each being connected in parallel to at least one of the N first diodes included on the N charging paths and the (N+1) second diodes included on the (N+1) discharging paths.

A capacity of the auxiliary capacitor may be less than a capacity of each positive-side capacitor and a capacity of each negative-side capacitor.

The capacity of the auxiliary capacitor may be 1/1000 to 1/100 of the capacity of each positive-side capacitor and the capacity of each negative-side capacitor.

Each auxiliary capacitor may be connected in parallel to any one of the first diodes and the second diode.

Each auxiliary capacitor may be connected in parallel to any one of each of the N first diodes and each of the (N+1) second diodes.

A wire inductance of each charging path may be less than a wire inductance of each discharging path.

A second aspect of the present invention provides a power conversion apparatus. The power conversion apparatus may comprise the snubber circuit of the first aspect. The power conversion apparatus may comprise a switch circuit connected to the positive-side terminal and the negative-side terminal.

The switch circuit may be an inverter having upper and lower arms. When any one of the upper and lower arms becomes non-conductive, a period ΔT1 after a voltage applied to the arm reaches a power supply voltage until the voltage becomes a summed voltage of the positive-side capacitor and the negative-side capacitor in series with each other and a period ΔT2 from an end of the period ΔT1 to an end of charging of at least one of the positive-side capacitor and the negative-side capacitor may satisfy the following relationship: ΔT1 is equal to or smaller than ΔT2 and ΔT2 is smaller than 5×ΔT1.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention. However, the embodiments do not limit the invention defined in the claims. Also, all combinations of features described in the embodiments are not necessarily essential to solution means of the invention.

1. Circuit Configuration of Power Conversion Apparatus

Figure 1:
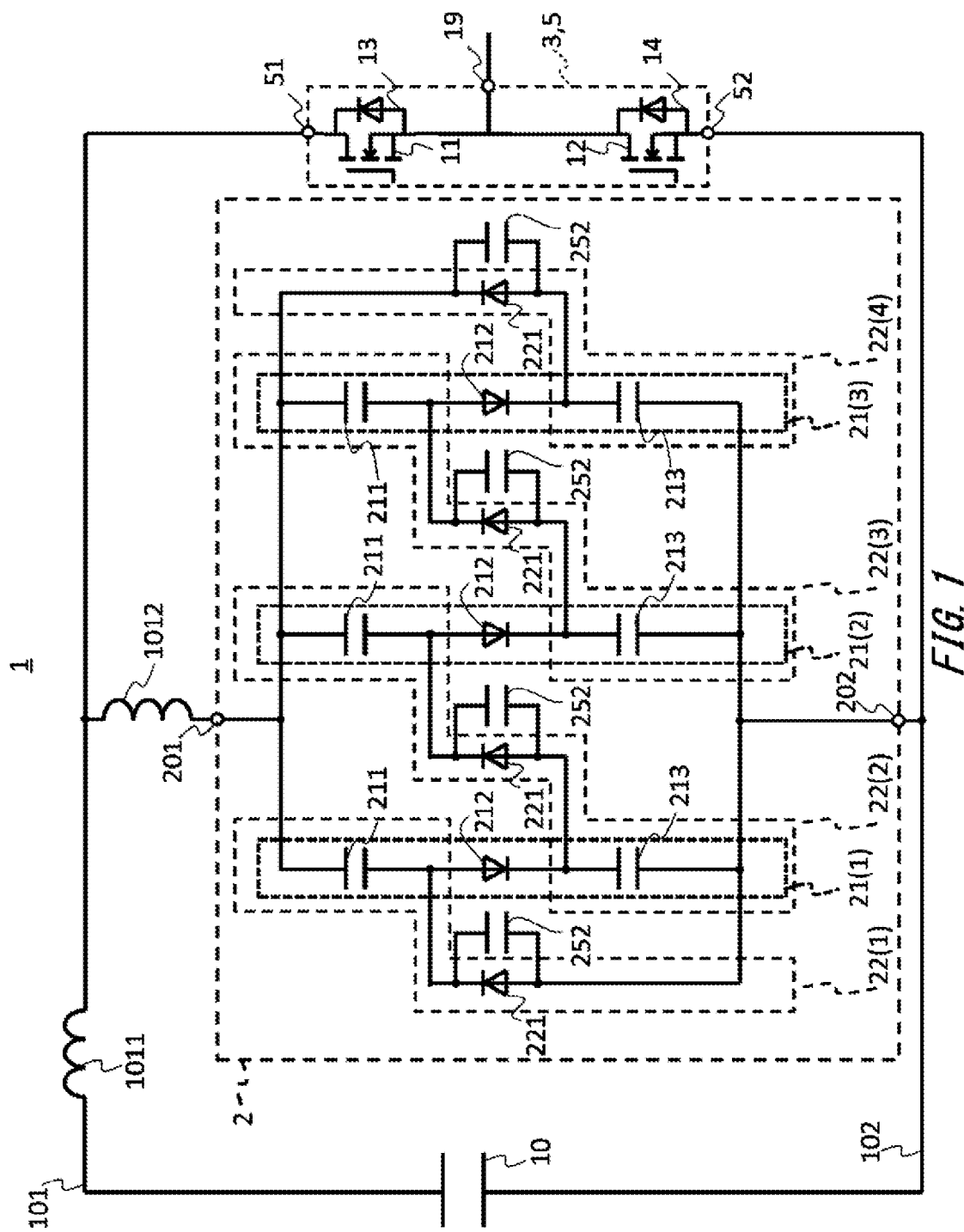
FIG. 1 is a circuit diagram of a power conversion apparatus 1 in accordance with the present embodiment.

FIG. 1 is a circuit diagram of a power conversion apparatus 1 in accordance with the present embodiment. The power conversion apparatus 1 is a circuit for one phase configured to convert DC power into polyphase AC power. The power conversion apparatus 1 outputs, from a power supply output terminal 19, a voltage converted by switching connection between each electrode of a power supply capacitor 10 and the power supply output terminal 19. In the meantime, a return path of AC current to be output may be the power supply output terminal 19 for other phase. The power supply output terminal 19 may be connected to an inductive load (not shown). The power conversion apparatus 1 includes a power supply capacitor 10, a switch circuit 3, and a snubber circuit 2. In the meantime, the power conversion apparatus 1 may convert the DC power into single phase AC power with the switch circuit 3. In this case, the power conversion apparatus 1 may include two power supply capacitors 10 connected in series, and the return path of AC current to be output from the power supply output terminal 19 may be a center point between the power supply capacitors 10.

The power supply capacitor 10 functions as a DC power supply. One terminal of the power supply capacitor 10 is connected to a positive-side wire 101, and the other terminal is connected to a negative-side wire 102. In FIG. 1, one power supply capacitor 10 is shown. However, the power conversion apparatus 1 may include a plurality of power supply capacitors 10 connected in series or in parallel.

The switch circuit 3 is connected between the positive-side wire 101 and the negative-side wire 102. Thereby, the switch circuit 3 is connected between a positive-side terminal 201 and a negative-side terminal 202 of the snubber circuit 2, which will be described later. The switch circuit 3 of the present embodiment may be a DC/AC inverter, and includes switching elements 11 and 12 as an upper arm and a lower arm in the power conversion apparatus 1, and flywheel diodes 13 and 14.

The switching elements 11 and 12 are sequentially connected in series between the negative-side wire 102 and the positive-side wire 101. A drain terminal and the source terminal of each of the switching elements 11 and 12 are respectively connected to the side of the positive-side wire 101 and the side of the negative-side wire 102. Gate terminals of the switching elements 11 and 12 are connected to a gate driving circuit (not shown), so that on and off operations of the switching elements 11 and 12 are controlled. For example, the switching elements 11 and 12 may be controlled so that they are to be selectively in a connection state with dead time, for which both the switching elements are in off states, being provided therebetween. The switching elements 11 and 12 may be controlled in a PWM manner. A center point between the switching element 11 and the switching element 12 is connected to the power supply output terminal 19.

The switching elements 11 and 12 may be silicon semiconductor elements whose base material is silicon or wide band gap semiconductor elements. The wide band gap semiconductor element is a semiconductor element having a greater bandgap than the silicon semiconductor element, and is, for example, a semiconductor element including SiC, GaN, diamond, a gallium nitride-based material, a gallium oxide-based material, AlN, AlGaN, ZnO or the like. In the meantime, the switching elements 11 and 12 may be MOSFETs or semiconductor elements having other structure, such as IGBT, bipolar transistor and the like.

The flywheel diodes 13 and 14 are anti-parallel connected to the switching elements 11 and 12 so that a side facing toward the positive-side wire 101 is to be a cathode, respectively. The flywheel diodes 13 and 14 may be Schottky barrier diodes. The flywheel diodes 13 and 14 may be silicon semiconductor elements or wide band gap semiconductor elements.

At least two of the switching elements 11 and 12 and the flywheel diodes 13 and 14 may be modularized as a semiconductor module 5. In the present embodiment, as an example, the switching elements 11 and 12 and the flywheel diodes 13 and 14 are modularized as the semiconductor module 5. In this case, the drain terminal of the positive-side switching element 11 may be a positive-side terminal 51 of the semiconductor module 5, and the source terminal of the negative-side switching element 12 may be a negative-side terminal 52 of the semiconductor module 5.

[1.1. Snubber Circuit 2]

The snubber circuit 2 protects each element of the power conversion apparatus 1 by absorbing a surge voltage that is generated when the switching elements 11 and 12 interrupt current. The snubber circuit 2 may be connected between the positive-side wire 101 and the negative-side wire 102 via a positive-side terminal 201 and a negative-side terminal 202. In the meantime, a wire (as an example, a wire including the positive-side wire 101 and the negative-side wire 102) between the snubber circuit 2 and the power supply capacitor 10 may have a wire inductance 1011, in accordance with a wire length thereof. Also, a wire (as an example, a wire including the positive-side wire 101 and the negative-side wire 102) between the snubber circuit 2 and the switching elements 11 and 12 may have a wire inductance 1012, in accordance with a wire length thereof.

The snubber circuit 2 includes N parallel charging paths 21, (N+1) parallel discharging paths 22, and at least one auxiliary capacitor 252. In the meantime, quantity N is an integer equal to or greater than 1, and is 3, for example, in the present embodiment. Also, in the present embodiment, as an example, the three charging paths 21 are referred to as a first charging path 21(1), a second charging path 21(2) and a third charging path 21(3), in corresponding order from the left side in the drawings. Also, the four discharging paths 22 are referred to as a first discharging path 22(1), a second discharging path 22(2), a third discharging path 22(3), and a fourth discharging path 22(4), in corresponding order from the left side in the drawings.

Each charging path 21 has a positive-side capacitor 211, a first diode 212, and a negative-side capacitor 213 sequentially connected in series between the positive-side terminal 201 and the negative-side terminal 202. Each of the positive-side capacitor 211 and the negative-side capacitor 213 functions as a snubber capacitor, and may absorb an instantaneous surge voltage that is generated when the switching elements 11 and 12 are driven (as an example, a surge voltage to be applied to an element during a period greater than 10 ns and less than 10 μs). For example, the positive-side capacitor 211 and the negative-side capacitor 213 may suppress vibrations higher than 100 kHz and lower than 100 MHz. The positive-side capacitor 211 and the negative-side capacitor 213 may be film capacitors or stacked ceramic capacitors, as an example.

The first diode 212 is arranged so that an anode faces toward the side of the positive-side terminal 201 and a cathode faces toward the side of the negative-side terminal 202. Thereby, each charging path 21 causes the current to flow from the side of the positive-side terminal 201 toward the side of the negative-side terminal 202.

Each discharging path 22 has a second diode 221. The second diode 221 is connected between the negative-side terminal 202 or the negative-side capacitor 213 of a $k^{th}$ charging path 21 (k: integer equal to or greater than 0 and equal to or smaller than N) of the N charging paths 21 and the positive-side capacitor 211 of a $(k+1)^{th}$ charging path 21 of the N charging paths 21 or the positive-side terminal 201. For example, the second diode 221 of the first discharging path 22(1) is connected between the negative-side terminal 202 and the positive-side capacitor 211 of the first charging path 21(1). The second diode 221 of the second discharging path 22(2) is connected between the negative-side capacitor 213 of the first charging path 21(1) and the positive-side capacitor 211 of the second charging path 21(2). The second diode 221 of the third discharging path 22(3) is connected between the negative-side capacitor 213 of the second charging path 21(2) and the positive-side capacitor 211 of the third charging path 21(3). The second diode 221 of the fourth discharging path 22(4) is connected between the negative-side capacitor 213 of the third charging path 21(3) and the positive-side terminal 201. The second diode 221 is arranged so that an anode faces toward the side of the $k^{th}$ charging path 21(k) or the negative-side terminal 202 and a cathode faces toward the side of the $(k+1)^{th}$ charging path 21(k+1) or the positive-side terminal 201. Thereby, each discharging path 22 causes the current to flow from the side of the negative-side terminal 202 toward the side of the positive-side terminal 201 via at least one of the negative-side capacitor 213 and the positive-side capacitor 211.

In the meantime, a wire inductance of each charging path 21 may be less than a wire inductance of each discharging path 22. For example, a wire length of each charging path 21 may be shorter than a wire length of each discharging path 22. As an example, the wire length of each charging path 21 connecting the positive-side terminal 201 and the negative-side terminal 202 may be shorter than the wire length of each discharging path 22 connecting the positive-side terminal 201 and the negative-side terminal 202.

The auxiliary capacitors 252 are each connected in parallel to at least one of the (N+1) second diodes 221 included in the (N+1) discharging paths 22. In the present embodiment, as an example, the snubber circuit 2 has the (N+1) auxiliary capacitors 252, and each of the auxiliary capacitors 252 is connected in parallel to each of the (N+1) second diodes 221.

A capacity of each auxiliary capacitor 252 may be less than a capacity of each positive-side capacitor 211 and a capacity of each negative-side capacitor 213. For example, the capacity of the auxiliary capacitor 252 may be 1/1000 to 1/100 of the capacity of each positive-side capacitor 211 and the capacity of each negative-side capacitor 213. The capacities of each of the auxiliary capacitors 252 may be the same as or different from each other.

Also, a charging voltage of each auxiliary capacitor 252 may be lower than a charging voltage of the negative-side capacitor 213 at a timing at which the switching elements 11 and 12 interrupt current. Thereby, each auxiliary capacitor 252 may draw current flowing from the side of the positive-side terminal 201 toward the first diode 212.

[1.1.1. Operations of Snubber Circuit 2]

[1.1.1(1). Operations of Snubber Circuit of Comparative Example]

Before describing operations of the snubber circuit 2 of the present embodiment, operations of a snubber circuit 200 (refer to FIGS. 2 and 3) of Comparative Example are described. The snubber circuit 200 is different from the snubber circuit 2, in that the auxiliary capacitor 252 is not provided.

First, operations are described which are performed when the switching element 11 is turned off in a state in which the switching element 11 is in an on state and the switching element 12 is in an off state. In the state in which the switching element 11 is in an on state and the switching element 12 is in an off state, the output current flows through a path of the power supply capacitor 10, the positive-side wire 101, the switching element 11 and the power supply output terminal 19. At this time, the output current flows through the wire inductance 1012 and energy is accumulated therein.

Figure 2:
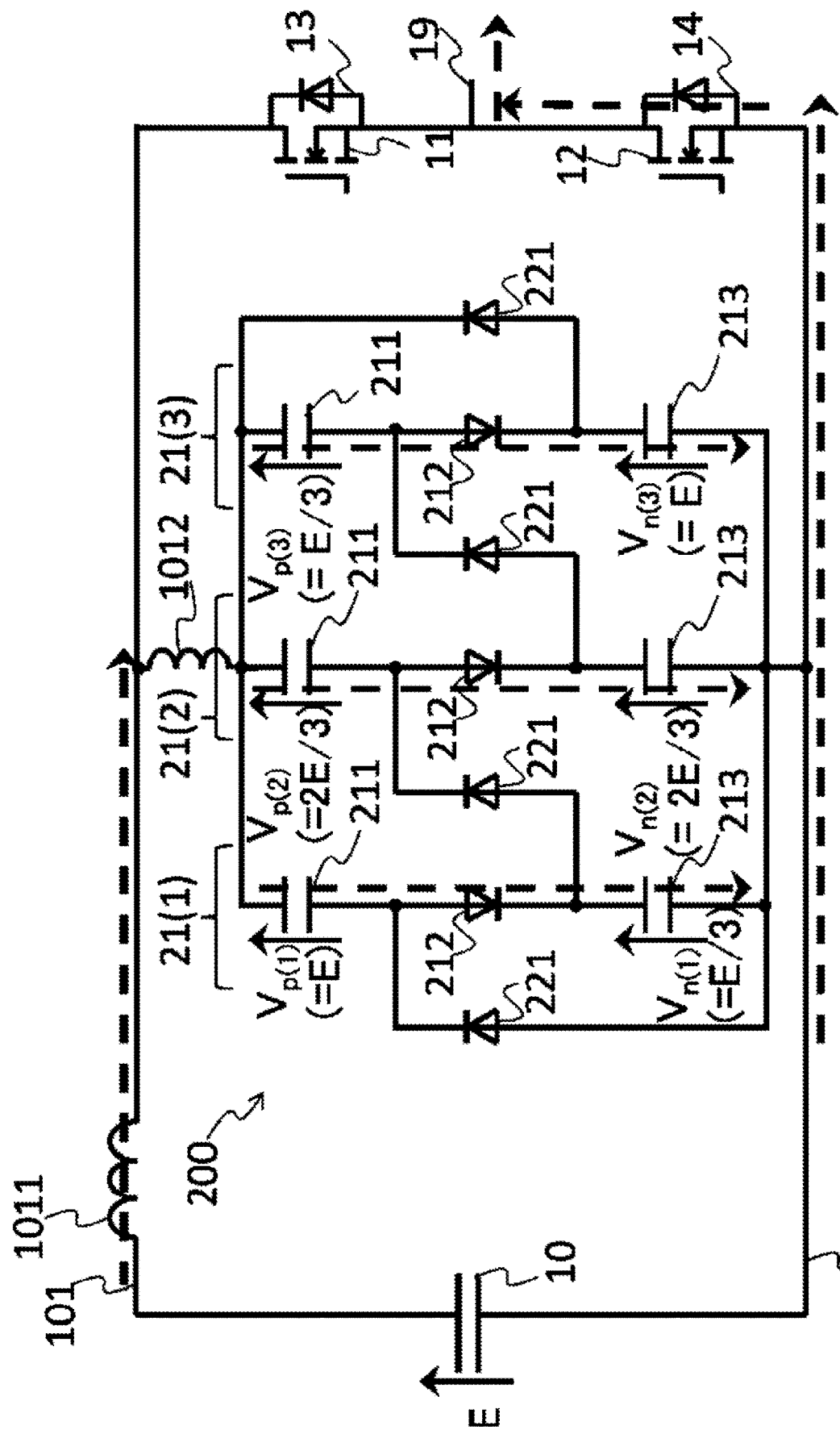
FIG. 2 shows flow of current when a switching element 11 is turned off in Comparative Example.

FIG. 2 shows flow of current when the switching element 11 is turned off from this state, in Comparative Example. In the meantime, the broken line arrows in FIG. 2 indicate the flow of current, and the solid line arrows indicate voltages of the power supply capacitor 10, the positive-side capacitor 211, the negative-side capacitor 213 and the like, and voltages that are generated by the wire inductance 1012 and the like.

When the switching element 11 is turned off, the output current is commutated, so that it flows from the power supply capacitor 10 and the positive-side wire 101 through the positive-side capacitor 211, the first diode 212 and the negative-side capacitor 213 of each charging path 21 and is output from the power supply output terminal 19 via the flywheel diode 14. Thereby, the current energy of the wire inductance 1012 is absorbed by charging of the positive-side capacitor 211 and negative-side capacitor 213 of the charging path 21. Then, the output current is all finally commutated to a path of the power supply capacitor 10, the negative-side wire 102, the flywheel diode 14 and the power supply output terminal 19. Thereby, the commutation associated with the turn-off operation of the switching element 11 is completed.

Figure 3:
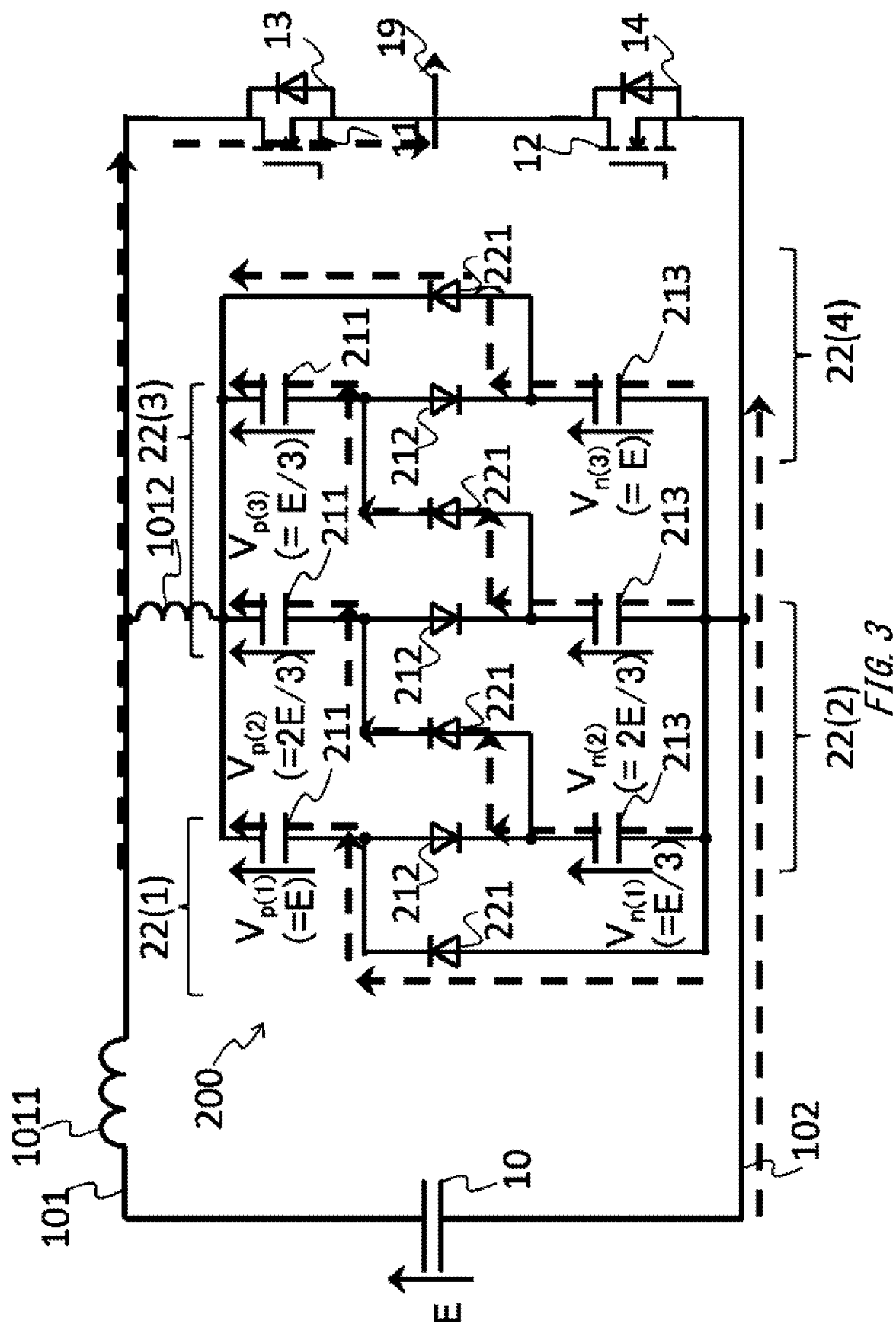
FIG. 3 shows flow of current when the switching element 11 is turned on in Comparative Example.

FIG. 3 shows flow of current when the switching element 11 is again turned on from the state in which the turn-off operation of the switching element 11 is completed, in Comparative Example.

When the switching element 11 is again turned on, the output current flowing through the path of the power supply capacitor 10, the negative-side wire 102, the flywheel diode 14 and the power supply output terminal 19 is commutated to a path of the power supply capacitor 10, the negative-side wire 102, the second diode 221 of each discharging path 22, the switching element 11 and the power supply output terminal 19. At this time, the energy during the turn-off operation, which is accumulated in the positive-side capacitor 211 and/or the negative-side capacitor 213 provided on the anode-side/cathode-side of the second diode 221, is released. Then, the output current is all finally commutated to the path of the power supply capacitor 10, the positive-side wire 101, the switching element 11 and the power supply output terminal 19. Thereby, the commutation associated with the turn-on operation of the switching element 11 is completed.

Herein, the voltages of the positive-side capacitor 211 and the negative-side capacitor 213 during the turn-off and turn-on operations of the switching element 11 are described. During the turn-off operation, a relationship between the voltages of the positive-side capacitor 211 and the negative-side capacitor 213 of each charging path 21 is expressed by a following equation (1). In the equation, E indicates a voltage of the power supply capacitor 10, and $V_{dc\text{-}off}$ indicates a voltage between the terminals, i.e., a voltage between the positive-side wire 101 and the negative-side terminal 202 during the turn-off operation. Also, $V_{p(1)}$ to $V_{p(3)}$ indicate voltages of the positive-side capacitors 211 of the first charging path 21(1) to the third charging path 21(3). Also, $V_{n(1)}$ to $V_{n(3)}$ indicate voltages of the negative-side capacitors 213 of the first charging path 21(1) to the third charging path 21(3).

$$E \leq (V_{p(1)} + V_{n(1)}) = (V_{p(2)} + V_{n(2)}) \qquad (1)$$
$$= (V_{p(3)} + V_{n(3)})$$

Also, during the turn-on operation, a relationship between the voltages of the positive-side capacitor 211 and the negative-side capacitor 213 of each charging path 21 is expressed by a following equation (2). In the equation, $V_{dc\text{-}oN}$ indicates a voltage between the terminals, i.e., a voltage between the positive-side wire 101 and the negative-side terminal 202 during the turn-on operation.

$$E \geq V_{p(1)} = (V_{n(1)} + V_{p(2)}) \qquad (2)$$
$$= (V_{n(2)} + V_{p(3)})$$
$$= V_{n(3)}$$
$$= V_{dc\text{-}oN}$$

By the equations (1) and (2), a relationship between voltages of each positive-side capacitor 211 and each negative-side capacitor 213 is expressed by a following equation (3) (also, refer to the voltages shown in FIGS. 2 and 3). In the equation, $V_{dc}$ indicates a voltage between the terminals, i.e., a voltage between the positive-side terminal 51 and the negative-side terminal 52 in a stationary state.

$$E = V_{dc} \approx V_{p(1)} \qquad (3)$$
$$= V_{n(3)}$$
$$= 1.5 \times V_{p(2)}$$
$$= 1.5 \times V_{n(2)}$$
$$= 3 \times V_{n(1)}$$
$$= 3 \times V_{p(3)}$$

From the equation (3), it can be seen that, when capacitor current is interrupted, a charging voltage (as an example, 4E/3 in FIG. 3) of each charging path 21 is higher than a discharging voltage (as an example, E in FIG. 3) of each discharging path 22. In the meantime, also in the turn-on and turn-off operations of the switching element 12 when the output current flows in a reverse direction, the similar effects are achieved due to symmetry of the circuit, and the detailed descriptions thereof are thus omitted.

According to the snubber circuit 200 of Comparative Example, the N parallel charging paths 21 each of which has the positive-side capacitor 211 and the negative-side capacitor 213 are provided. Therefore, when the current is interrupted by the semiconductor module 5, the energy accumulated in the wire inductance 1012 charges the positive-side capacitor 211 and the negative-side capacitor 213 to voltages higher than the voltage between the positive-side wire 101 and the negative-side terminal 202, through each charging path 21. Thereby, element breakdown, which is caused due to the surge voltage, is prevented.

Also, the snubber circuit 200 is provided with the (N+1) discharging paths 22 that cause the current to flow from the side of the negative-side terminal 202 toward the side of the positive-side terminal 201 via at least one of the negative-side capacitor 213 and the positive-side capacitor 211. Therefore, when the current is caused to flow by the semiconductor module 5, the energy accumulated in the positive-side capacitor 211 and the negative-side capacitor 213 is discharged and the discharging voltage of each discharging path 22 is reduced to the voltage between the positive-side terminal 201 and the negative-side terminal 202.

Here, when the current is interrupted, the charging voltage of each of the N charging paths 21 is higher than the discharging voltage of each of the discharging paths 22, so that the energy having charged the charging path 21 as a result of the interruption of current cannot further charge the charging path 21 even if the energy is discharged by the discharging path 22. Therefore, the energy having charged the positive-side capacitor 211 and the negative-side capacitor 213 when the current is interrupted is accumulated and regenerated by the positive-side capacitor 211 and the negative-side capacitor 213 without being charged and discharged and thus consumed as loss of circuit by a resonance operation of the wire inductance 1011 and the positive-side capacitor 211 and negative-side capacitor 213. Thereby, the loss of circuit due to the resonance operation is reduced.

Also, since the element breakdown due to the surge voltage upon the interruption of current is prevented and the loss of circuit is reduced, an acceptable amount of inductance of wires connected to the positive-side terminal 51 and the negative-side terminal 52 of the semiconductor module 5 can be increased. That is, it is possible to increase a degree of freedom of wire lengths of the positive-side wire 101 and the negative-side wire 102.

In the meantime, as described above, in the snubber circuit 200 of Comparative Example, the charging voltage of each charging path 21 when the current is interrupted is 4E/3(V). Therefore, a voltage $\Delta V1$, which is generated due to the wire inductance 1012, of the surge voltage instantaneously generated between the positive-side wire 101 and the negative-side wire 102 is generated in a form of being added to 4E/3(V), based on 4E/3(V).

In contrast, when a single snubber capacitor is connected between the positive-side wire 101 and the negative-side wire 102, a charging voltage of the snubber capacitor becomes E(V). Therefore, the voltage $\Delta V1$, which is generated due to the wire inductance 1012, of the surge voltage is generated in a form of being added to E(V). Therefore, in the snubber circuit 200 of Comparative Example, the entire surge voltage instantaneously generated between the positive-side wire 101 and the negative-side wire 102 due to the wire inductance 1012, i.e., a summed voltage of the voltage $\Delta V1$ and the voltage corresponding to the base becomes larger than the case where a single snubber capacitor is connected between the positive-side wire 101 and the negative-side wire 102.

[1.1.1(2). Operations of Snubber Circuit 2 of Present Embodiment]

Subsequently, operations of the snubber circuit 2 of the present embodiment are described. In the meantime, unless otherwise described, the charging voltages of the positive-side capacitor 211 and the negative-side capacitor 213 in the snubber circuit 2 may be similar to the snubber circuit 200.

In the state in which the switching element 11 is in an on state and the switching element 12 is in an off state, the output current flows through a path of the power supply capacitor 10, the positive-side wire 101, the switching element 11 and the power supply output terminal 19. At this time, the output current flows through the wire inductance 1012 and energy is accumulated therein. When the switching element 11 is turned on from this state, the current may flow in the snubber circuit 2, in aspects of a mode (1) to a mode (5).

Figure 4:
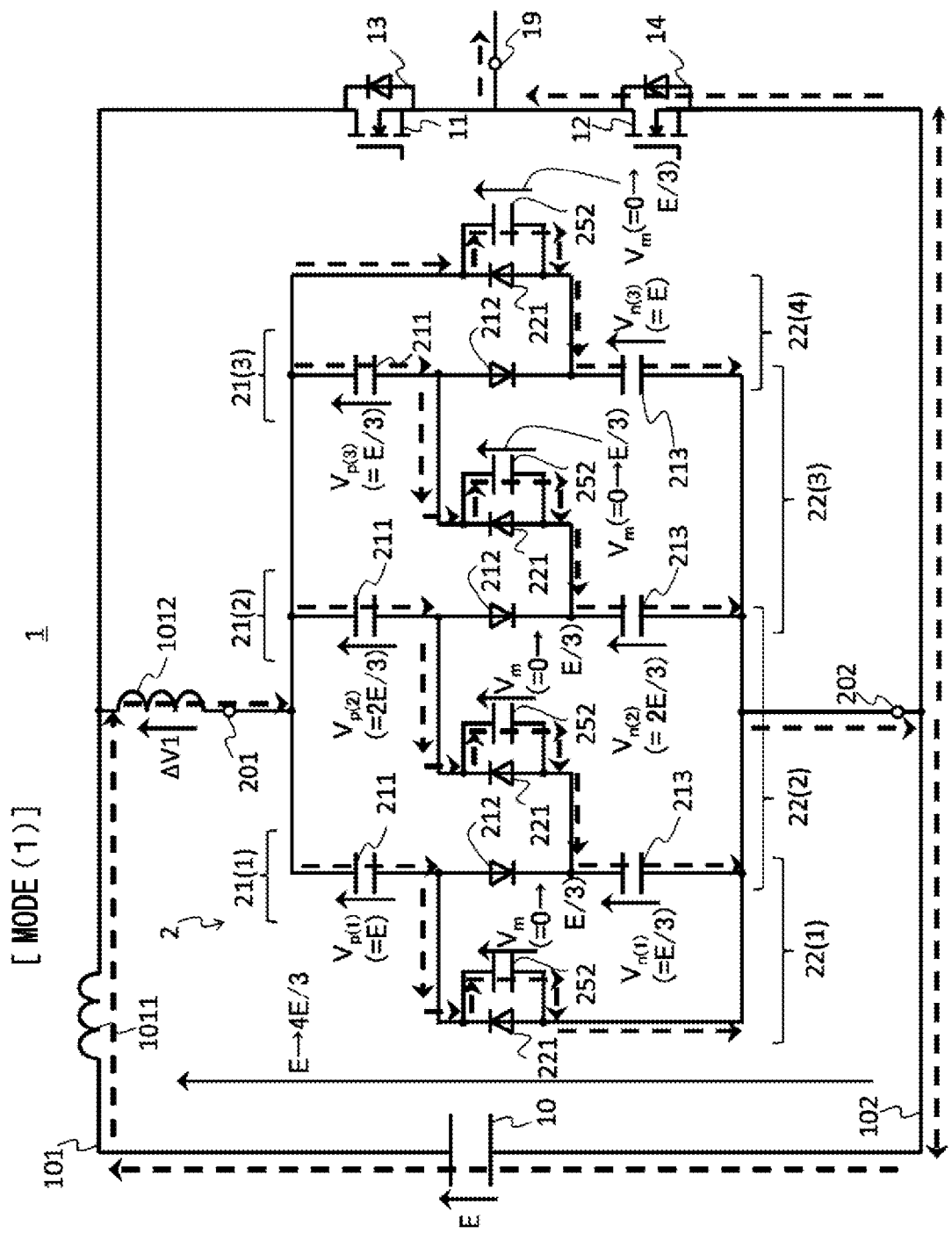
FIG. 4 shows flow of current in a mode (1).

FIG. 4 shows flow of current in a mode (1). When the switching element 11 is turned off, the output current is commutated and flows from the power supply capacitor 10 and the positive-side wire 101 into each charging path 21. At this time, a charging voltage $V_m$ of each auxiliary capacitor 252 is set lower than a charging voltage $V_n$ of the negative-side capacitor 213, and is 0(V), for example, in the present embodiment. For this reason, the current having flowed into the positive-side capacitor 211 of the charging path 21 flows toward the auxiliary capacitor 252 without flowing toward the first diode 212 and the negative-side capacitor 213. Thereby, the current energy of the wire inductance 1012 is absorbed by the charging of the positive-side capacitor 211 and the auxiliary capacitor 252.

In this way, in the snubber circuit 2 of the present embodiment, at an early stage at which the current is interrupted, a series circuit of the positive-side capacitor 211 and the auxiliary capacitor 252 functions as a charging path (also referred to as 'bypass charging path'), and the charging voltage in each bypass charging path is E(V). Therefore, the voltage ΔV1, which is generated due to the wire inductance 1012, of the surge voltage is generated in a form of being added to E(V), based on E(V).

In the meantime, the voltage $V_m$ of the auxiliary capacitor 252 may increase to E/3(V).

Thereby, a summed voltage of the positive-side capacitor 211 in series with the negative-side capacitor 213 on the bypass charging path and the auxiliary capacitor 252 increases to a voltage of the positive-side capacitor 211 in series on the same charging path 21 as the corresponding negative-side capacitor 213. As an example, a summed voltage of the voltage 2E/3(V) of the positive-side capacitor 211 on the bypass charging path including the positive-side capacitor 211 of the charging path 21(2) and the negative-side capacitor 213 of the charging path 21(1) and the voltage $V_m$(V) of the auxiliary capacitor 252 increases to the voltage E(V) of the positive-side capacitor 211 of the charging path 21(1).

In other words, the summed voltage of the negative-side capacitor 213 and the auxiliary capacitor 252 on the bypass charging path into which the current flows from the positive-side capacitor 211 increases to the voltage of the negative-side capacitor 213 on the same charging path 21 as the positive-side capacitor 211. As an example, a summed voltage of the voltage E/3(V) of the negative-side capacitor 213 on the bypass charging path into which the current flows from the positive-side capacitor 211 of the charging path 21(2) and the auxiliary capacitor(V) increases to the voltage 2E/3(V) of the negative-side capacitor 213 of the charging path 21(2).

As a result, the voltage between the positive-side wire 101 and the negative-side wire 102 increases from E(V) to 4E/3(V).

Figure 5:
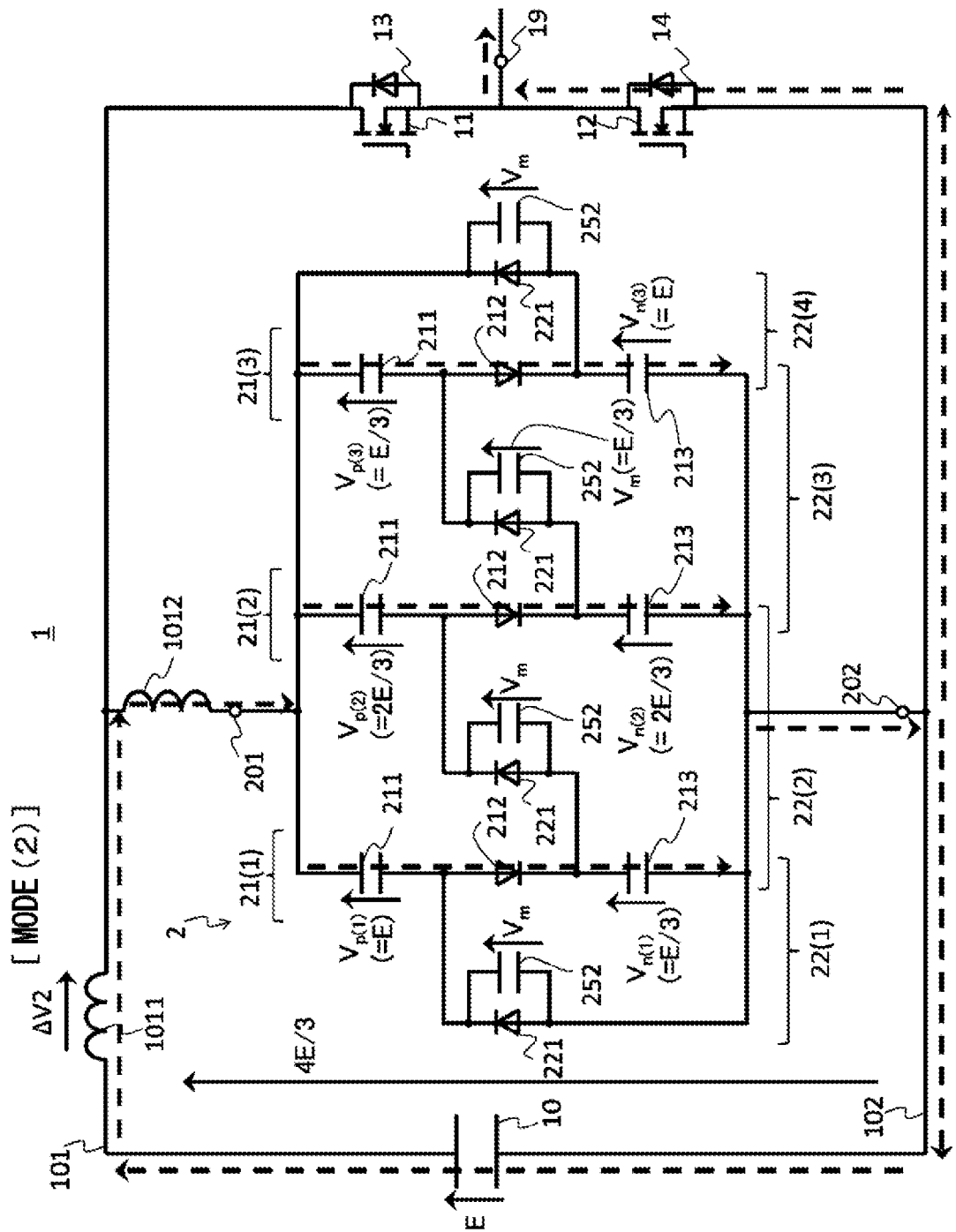
FIG. 5 shows flow of current in a mode (2).

FIG. 5 shows flow of current in a mode (2). When the voltage $V_m$ of the auxiliary capacitor 252 reaches E/3(V), a potential on the anode-side of the first diode 212 of each charging path 21 becomes higher than the cathode-side, so that the first diode 212 becomes conductive and the current flowing into the positive-side capacitor 211 of the charging path 21 flows through the negative-side capacitor 213 having a greater capacity than the auxiliary capacitor 252. Thereby, the current energy of the wire inductance 1012 is absorbed by the charging of the positive-side capacitor 211 and the negative-side capacitor 213. In the meantime, the current flowing through the positive-side capacitor 211 may also flow slightly through the auxiliary capacitor 252 to finely increase the voltage $V_m$ of the auxiliary capacitor 252.

By the above configuration, the current energy of the wire inductance 1012 is completely absorbed by the positive-side capacitor 211 and negative-side capacitor 213 and the auxiliary capacitor 252, so that the charging is completed. In the meantime, the energy of the current flowing into the positive-side capacitor 211 in the mode (2) generates a voltage ΔV2 due to the wire inductance 1011.

Figure 6:
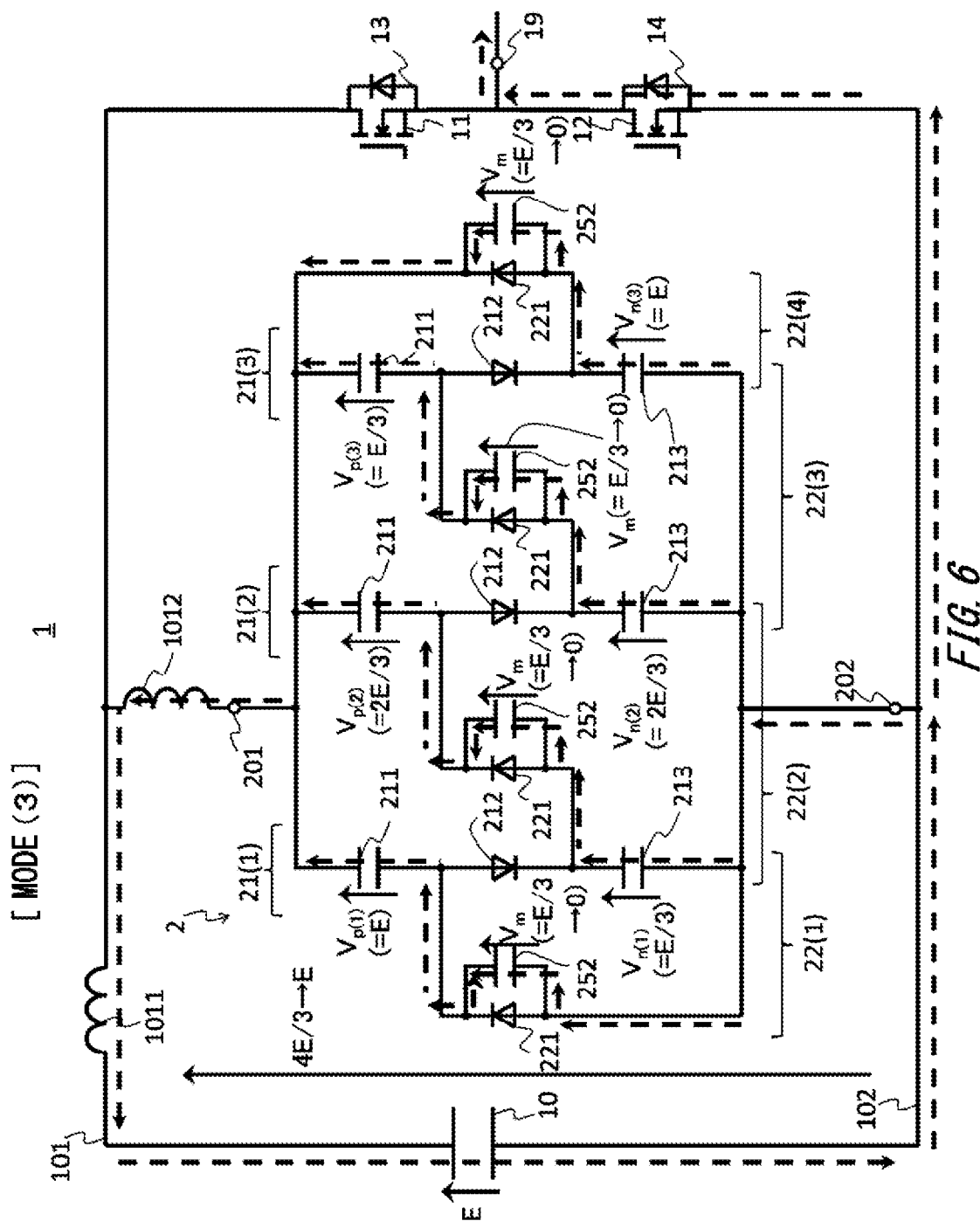
FIG. 6 shows flow of current in a mode (3).

FIG. 6 shows flow of current in a mode (3). When the current energy of the wire inductance 1012 is completely absorbed and the charging is thus completed, the discharging is performed via the bypass charging path because the charging voltage is equal to or higher than 4E/3(V) in the bypass charging path. In the meantime, since the capacity of each auxiliary capacitor 252 is less than the capacity of each of the positive-side capacitor 211 and the negative-side capacitor 213, the discharging may also be mainly performed from the auxiliary capacitor 252. Thereby, the voltage of each auxiliary capacitor 252 becomes 0(V), and the voltage between the positive-side wire 101 and the negative-side wire 102 is reduced from 4E/3(V) to E(V).

Figure 7:
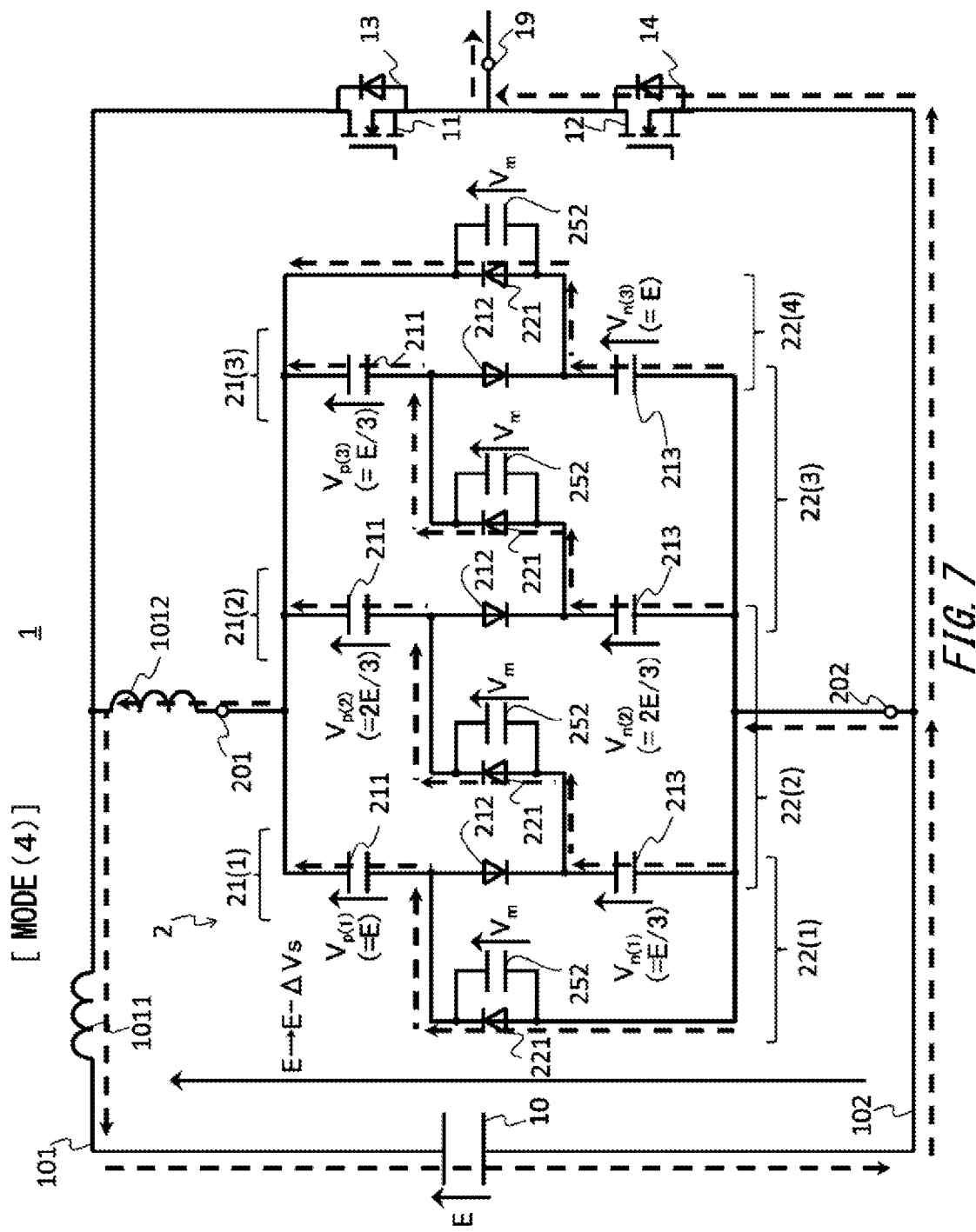
FIG. 7 shows flow of current in a mode (4).

FIG. 7 shows flow of current in a mode (4). When the voltage between the positive-side wire 101 and the negative-side wire 102 is reduced to E(V) and the voltage $V_m$ of the auxiliary capacitor 252 becomes 0(V), the current flows out from the snubber circuit 2 due to a self-inducing action of the wire inductance 1011, so that the discharging is performed from the positive-side capacitor 211 and the negative-side capacitor 213 of each discharging path 22. Thereby, the voltage between the positive-side wire 101 and the negative-side wire 102 may be reduced from E(V) to (E-ΔVs).

Figure 8:
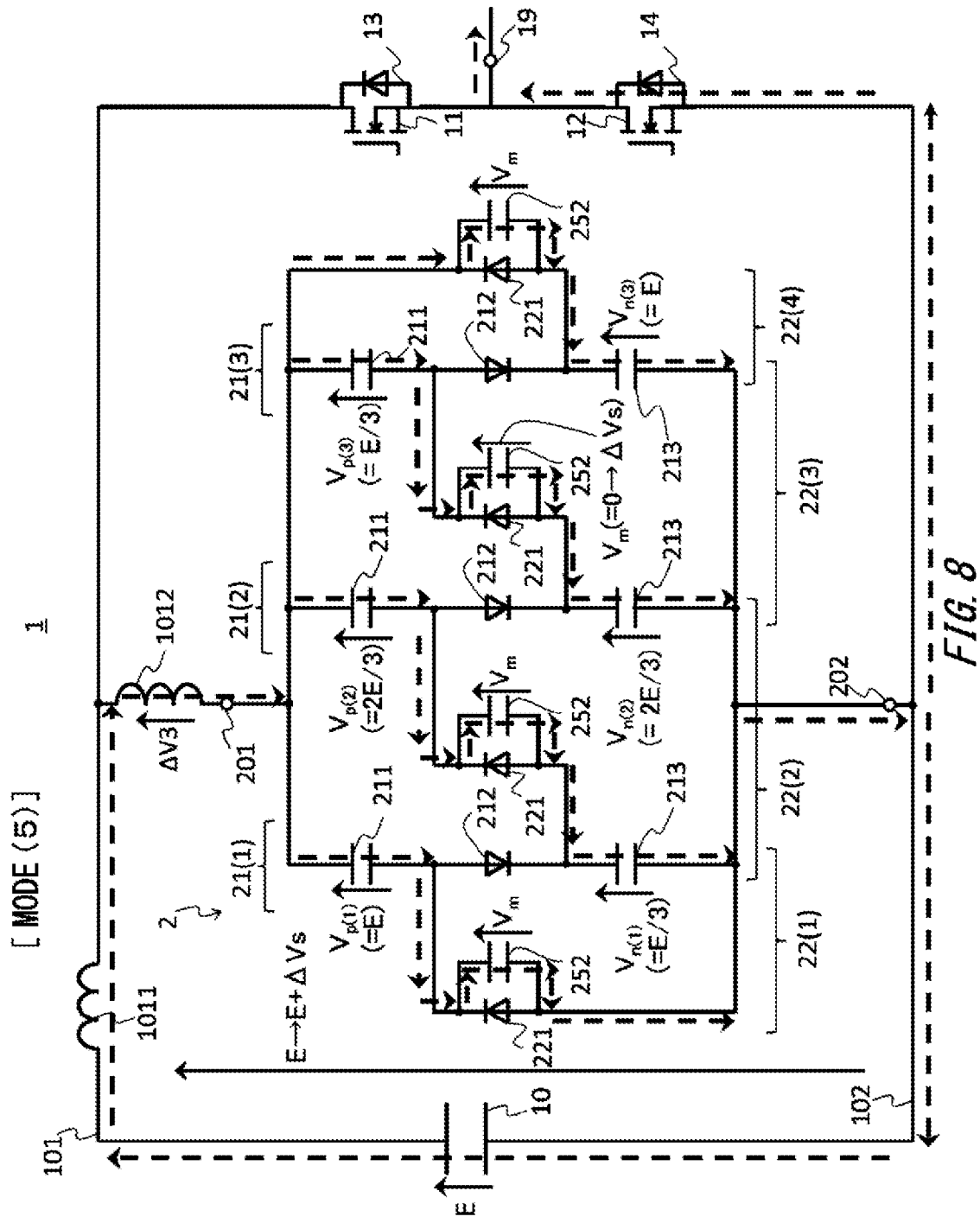
FIG. 8 shows flow of current in a mode (5).

FIG. 8 shows flow of current in a mode (5). When the voltage between the positive-side wire 101 and the negative-side wire 102 is reduced to (E-ΔVs) by the discharging from the positive-side capacitor 211 and the negative-side capacitor 213, the current from the wire inductance 1011 again flows into each charging path 21 due to a difference from a DC electromotive force E. At this time, the charging voltage $V_m$ of each auxiliary capacitor 252 is lower than the charging voltage $V_n$ of the negative-side capacitor 213, and is 0(V), for example, in the present embodiment. For this reason, the current flowing into the positive-side capacitor 211 of the charging path 21 again flows toward the auxiliary capacitor 252 without flowing toward the first diode 212 and the negative-side capacitor 213. Thereby, the current energy of the wire inductance 1011 is once absorbed by the charging of the positive-side capacitor 211 and the auxiliary capacitor 252. In the meantime, the energy of the current caused to flow into the charging path 21 by the mode (5) may generate a voltage ΔV3 due to the wire inductance 1012.

Thereafter, the charging and discharging in the mode (2) to the mode (5) are repeated by resonance of the wire inductance 1011, the auxiliary capacitor 252 and the like, so that the voltage $V_m$ of the auxiliary capacitor 252 converges to substantially ΔVs/2(V). Thereby, the commutation associated with the turn-off operation of the switching element 11 is completed. The energy lost due to the resonance is about ΔVs/2(V), and may be less than the energy corresponding to E/3(V), for example.

When the switching element 11 is again turned on, as with Comparative Example, the energy during the turn-off operation accumulated in the positive-side capacitor 211 and negative-side capacitor 213 and the auxiliary capacitor 252 is released, so that the commutation associated with the turn-on operation of the switching element 11 is completed.

Thereby, in the present embodiment, as an example, the charging voltage $V_m$ of each auxiliary capacitor 252 may become 0(V).

According to the snubber circuit 2, the auxiliary capacitors 252 are each connected in parallel to at least one of the plurality of first diodes 212 and the plurality of second diodes 221. Therefore, when the voltage ΔV1 is generated due to the wire inductance 1012, the current flowing from the positive-side wire 101 to the negative-side wire 102 is drawn from the positive-side capacitor 211 into the auxiliary capacitor 252 and charges the auxiliary capacitor 252. Therefore, the base voltage of the voltage ΔV1 that is generated due to the wire inductance 1012 can be set to the summed voltage (=E) of the positive-side capacitor 211 and the auxiliary capacitor 252, not the summed voltage (=4E/3) of the positive-side capacitor 211 and the negative-side capacitor 213. Therefore, it is possible to reduce the surge voltage that is instantaneously generated between the positive-side wire 101 and the negative-side wire 102.

Also, each auxiliary capacitors 252 is connected in parallel to each of the (N+1) second diodes 221. Therefore, even when there is a difference in the wire path length of the bypass charging path passing the auxiliary capacitor 252, the energy of the voltage ΔV1 that is generated due to the wire inductance 1012 can be absorbed at the early stage by the bypass charging path having the shorter path length, so that the surge voltage can be securely reduced.

Also, since the capacity of the auxiliary capacitor 252 is less than the capacity of each positive-side capacitor 211 and the capacity of each negative-side capacitor 213, it is possible to reduce the energy loss due to the resonance of the wire inductance 1011 and the auxiliary capacitor 252.

Also, since the capacity of the auxiliary capacitor 252 is equal to or greater than 1/1000 of the capacity of each positive-side capacitor 211 and the capacity of each negative-side capacitor 213, it is possible to securely reduce the surge voltage by drawing the current, as compared to a case where the capacity of the auxiliary capacitor 252 is less than 1/1000. Also, as compared to a case where the capacity of the auxiliary capacitor 252 is greater than 1/100 of the capacity of each positive-side capacitor 211 and the capacity of each negative-side capacitor 213, it is possible to securely reduce the energy loss due to the resonance of the wire inductance 1011 and the auxiliary capacitor 252.

Also, since the wire inductance of each charging path 21 is less than the wire inductance of each discharging path 22, it is possible to securely reduce the surge voltage by the charging path 21. Also, generation of excessive inrush current when the current is caused to flow by the discharging can be prevented by the wire inductance of the discharging path 22.

2. Operation Waveforms

Figure 9:
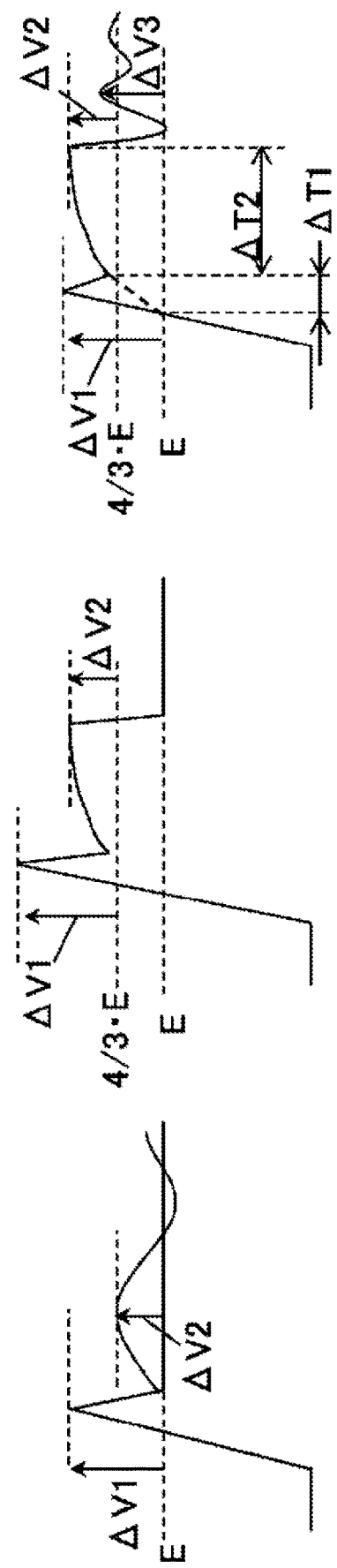
FIG. 9 shows voltages applied to the switching element 11 when the switching element 11 is turned off and becomes non-conductive.

FIG. 9 shows voltages applied to the switching element 11 when the switching element 11 is turned off and becomes non-conductive. In FIG. 9, the vertical axis indicates a voltage, and the horizontal axis indicates time. Also, in FIG. 9, the left graph indicates an operation waveform when a single snubber capacitor is connected between the positive-side wire 101 and the negative-side wire 102. In FIG. 9, the central graph indicates an operation waveform when the snubber circuit 200 of Comparative Example is connected between the positive-side wire 101 and the negative-side wire 102. In FIG. 9, the right graph indicates an operation waveform when the snubber circuit 2 of the present embodiment is connected between the positive-side wire 101 and the negative-side wire 102.

As shown with the left graph in FIG. 9, when the single snubber capacitor is connected, the voltage ΔV1 caused due to the wire inductance 1012 is generated in a form of being added to the voltage E(V) of the power supply capacitor 10, and the energy of the voltage ΔV2 caused due to the wire inductance 1011 is lost by the resonance of the wire inductance 1011 and the snubber capacitor.

Also, as shown with the central graph in FIG. 9, when the snubber circuit 200 of Comparative Example is connected, the voltage ΔV1 (a peak value of the voltage generated in the wire inductance 1012 due to the commutation to the snubber circuit 200 during the turn-off operation of the switching element 11 or 12) is generated in a form of being added to the voltage 4E/3(V) of the charging path 21. Also, since a resonance of the wire inductance 1011 and the snubber capacitor is not generated, the energy of the voltage ΔV2 is regenerated with being lost.

As shown with the right graph in FIG. 9, when the snubber circuit 2 of the present embodiment is connected, unlike the case where the snubber circuit 200 of Comparative Example is connected, the voltage ΔV1 is generated in a form of being added to the voltage E(V) of the power supply capacitor 10 without being generated in the form of being added to the voltage 4E/3(V) of the charging path 21, so that the element breakdown is prevented. Also, since the capacity of the auxiliary capacitor 252 resonating with the wire inductance 1011 is small, the energy of the voltage ΔV2 is regenerated without being substantially lost.

In the meantime, a broken line part of the right graph may also be the summed voltage of the positive-side capacitor 211 and the auxiliary capacitor 252 on the bypass charging path. A slope of the broken line part may change, in correspondence to the capacity of the auxiliary capacitor 252. For example, when the capacity of the auxiliary capacitor 252 is small, the slope of the broken line part may increase to come close to a slope of a solid line graph of a rising part.

Here, a period ΔT1 after the voltage applied to the switching element 11 reaches the power supply voltage E until the voltage becomes the summed voltage of the positive-side capacitor 211 and the negative-side capacitor 213 in series with each other and a period ΔT 2 from an end of the period ΔT1 to an end of the charging of the positive-side capacitor 211 or the negative-side capacitor may satisfy the following relationship: ΔT1 is equal to or smaller than ΔT2 and ΔT2 is smaller than 5×ΔT1. The end timing of the period ΔT1 may also be a timing at which the voltage applied to the switching element 11 returns to the summed voltage (in the present embodiment, as an example, a voltage having 4E/3 as an initial value) of the positive-side capacitor 211 and the negative-side capacitor 213 in series with each other after reaching the power supply voltage E and then becoming the peak value (E+ΔV1). This timing may also be a timing at which the current energy accumulated in the wire inductance 1012 becomes zero or a timing at which the current energy is completely absorbed by the snubber circuit 2. The end timing of the period ΔT2 may also be a timing at which the energy of the wire inductance 1011 is absorbed to reach 0(A) by the series voltage V of the positive-side capacitor 211 and the auxiliary capacitor 252. The periods ΔT1 and ΔT2 may be adjusted by the capacities of the positive-side capacitor 211, the negative-side capacitor 213 and the auxiliary capacitor 252.

As described above, according to the snubber circuit 2 of the present embodiment, since the periods ΔT1 and ΔT2 satisfy the relationship in which ΔT2 is smaller than 5×ΔT1, the energy accumulated in the auxiliary capacitor 252 is less, as compared to a case in which ΔT2 is equal to or greater than 5×ΔT1, so that it is possible to reduce the loss due to the resonance of the wire inductance 1011 and the auxiliary capacitor 252.

3. Modified Embodiments

Figure 10:
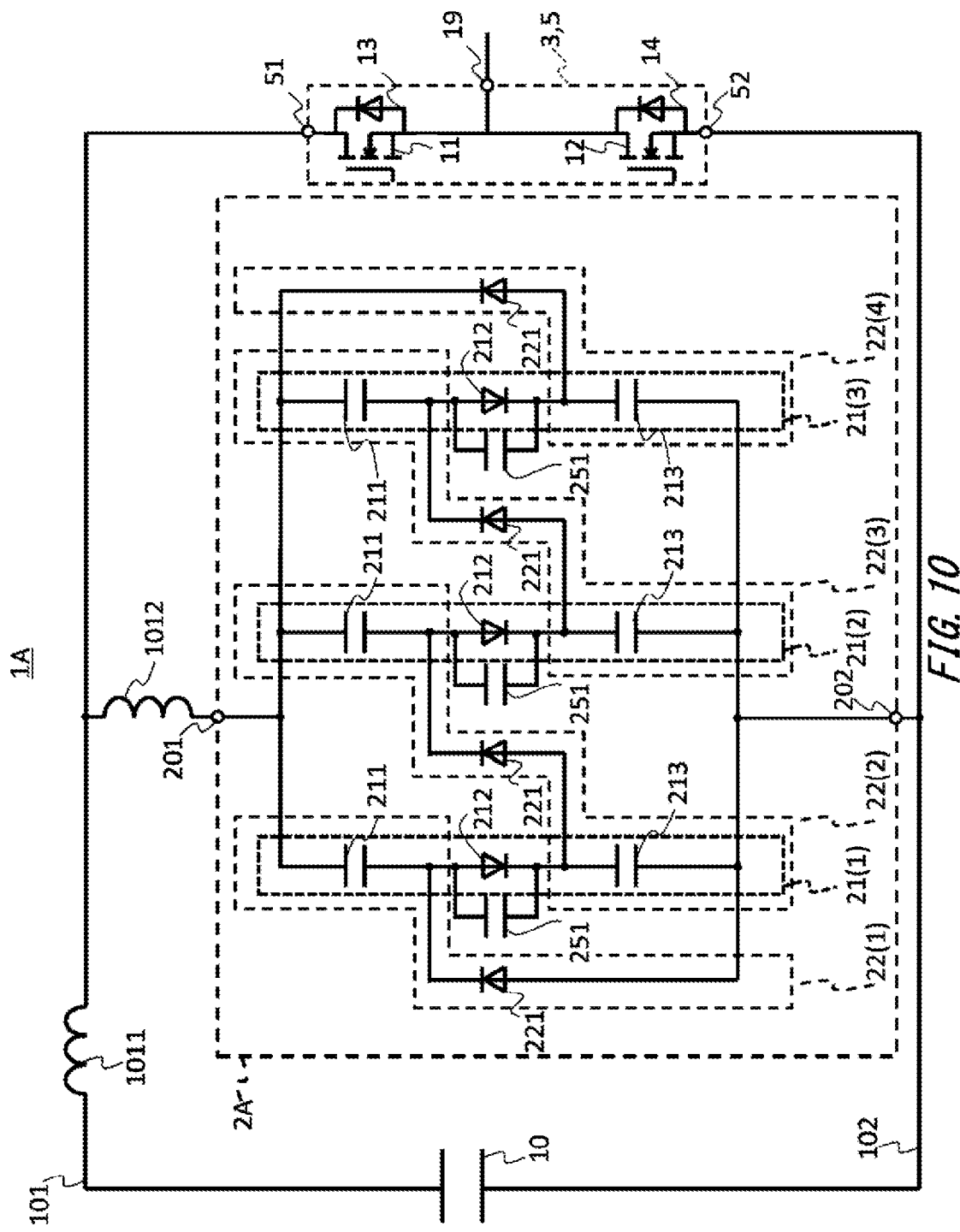
FIG. 10 shows a power conversion apparatus 1A in accordance with a modified embodiment.

FIG. 10 shows a power conversion apparatus 1A in accordance with a modified embodiment. A snubber circuit 2A of the power conversion apparatus 1A may include at least one auxiliary capacitor 251 each connected in parallel to at least one of the N first diodes 212 included in the N charging paths 21. In the present modified embodiment, as an example, the snubber circuit 2 includes the N auxiliary capacitors 251, and each auxiliary capacitor 251 is connected in parallel to each of the N first diodes 212. In a case where the auxiliary capacitor 251 has positive and negative polarities, each auxiliary capacitor 251 may be connected at the negative polarity to the anode-side of the first diode and may be connected at the positive polarity to the cathode-side.

The capacity of each auxiliary capacitor 251 may be less than the capacity of each positive-side capacitor 211 and the capacity of each negative-side capacitor 213. For example, the capacity of the auxiliary capacitor 251 may be ¹⁄₁₀₀₀ to ¹⁄₁₀₀ of the capacity of each positive-side capacitor 211 and the capacity of each negative-side capacitor 213. The capacities of each of the auxiliary capacitors 251 may be the same or different each other.

Also, a charging voltage $V_m$ of each auxiliary capacitor 251 may be lower than a charging voltage $V_n$ of the negative-side capacitor 213 at a timing at which the switching elements 11 and 12 interrupt current, and may be a negative voltage, for example. In the present modified embodiment, as an example, an absolute value of the voltage $V_m$ of each auxiliary capacitor 251 may be the same as the voltage $V_n$ of the negative-side capacitor 213. Thereby, each auxiliary capacitor 251 can draw the current flowing from the side of the positive-side terminal 201 toward the first diode 212.

[3.1. Operations of Snubber Circuit 2A of Modified Embodiment]

Subsequently, operations of the snubber circuit 2A of the present modified embodiment are described. In the meantime, unless otherwise described, the charging voltages of the positive-side capacitor 211 and the negative-side capacitor 213 in the snubber circuit 2A may be similar to the snubber circuits 2 and 200.

In the state in which the switching element 11 is in an on state and the switching element 12 is in an off state, the output current flows through a path of the power supply capacitor 10, the positive-side wire 101, the switching element 11 and the power supply output terminal 19. At this time, the output current flows through the wire inductance 1012 and energy is accumulated therein. When the switching element 11 is turned off from this state, the current may flow in the snubber circuit 2A, in aspects of a mode (1A) to a mode (5A).

Figure 11:
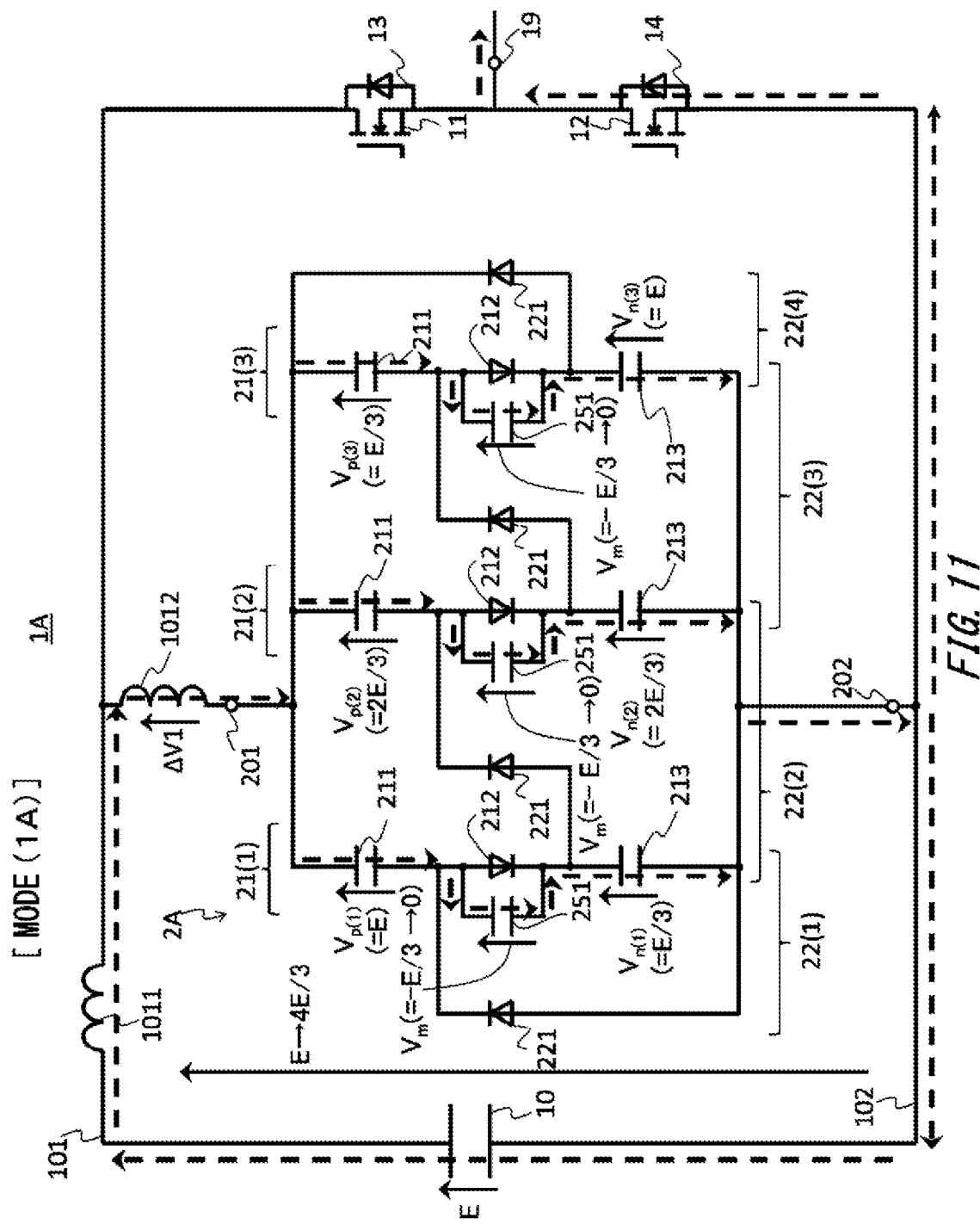
FIG. 11 shows flow of current in a mode (1A).

FIG. 11 shows flow of current in a mode (1A). When the switching element 11 is turned off, the output current is commutated and flows from the power supply capacitor 10 and the positive-side wire 101 into each charging path 21. At this time, the charging voltage $V_m$ of each auxiliary capacitor 251 is set lower than the charging voltage $V_n$ of the negative-side capacitor 213, and is −E/3(V), for example, in the present modified embodiment. For this reason, the current having flowed into the positive-side capacitor 211 of the charging path 21 flows through the negative-side capacitor 213 via the auxiliary capacitor 251 without flowing through the first diode 212. Thereby, the current energy of the wire inductance 1012 is absorbed by the charging of the positive-side capacitor 211, the auxiliary capacitor 251 and the negative-side capacitor 213.

In this way, in the snubber circuit 2A of the present modified embodiment, at an early stage at which the current is interrupted, a series circuit of the positive-side capacitor 211, the auxiliary capacitor 251 and the negative-side capacitor 213 functions as a bypass charging path, and the charging voltage in each bypass charging path is E(V). Therefore, the voltage ΔV1, which is generated due to the wire inductance 1012, of the surge voltage is generated in a form of being added to E(V), based on E(V).

In the meantime, the voltage $V_m$ of the auxiliary capacitor 251 may increase to 0(V). Thereby, the voltage between the positive-side wire 101 and the negative-side wire 102 increases from E(V) to 4E/3(V).

Figure 12:
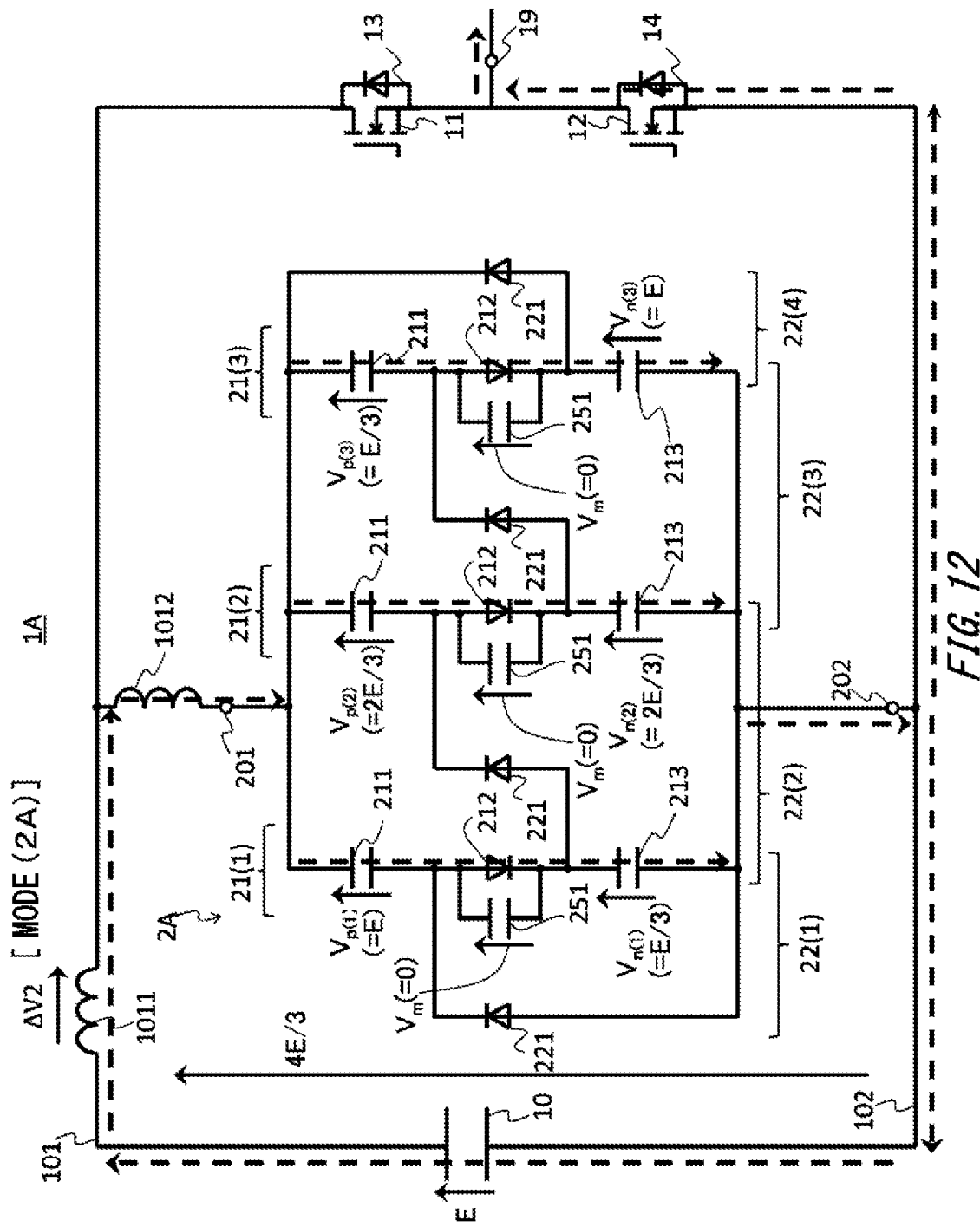
FIG. 12 shows flow of current in a mode (2A).

FIG. 12 shows flow of current in a mode (2A). When the voltage $V_m$ of the auxiliary capacitor 251 reaches 0(V), the current having flowed into the positive-side capacitor 211 of the charging path 21 flows through the negative-side capacitor 213 via the first diode 212. Thereby, the current energy of the wire inductance 1012 is absorbed by the charging of the positive-side capacitor 211 and the negative-side capacitor 213. In the meantime, the current flowing through the positive-side capacitor 211 may also flow slightly through the auxiliary capacitor 251 to finely increase the voltage $V_m$ of the auxiliary capacitor 251. By the above configuration, the current energy of the wire inductance 1012 is completely absorbed by the positive-side capacitor 211 and negative-side capacitor 213 and the auxiliary capacitor 251, so that the charging is completed. In the meantime, the energy of the current flowing into the positive-side capacitor 211 in the mode (2A) generates a voltage ΔV2 due to the wire inductance 1011.

Figure 13:
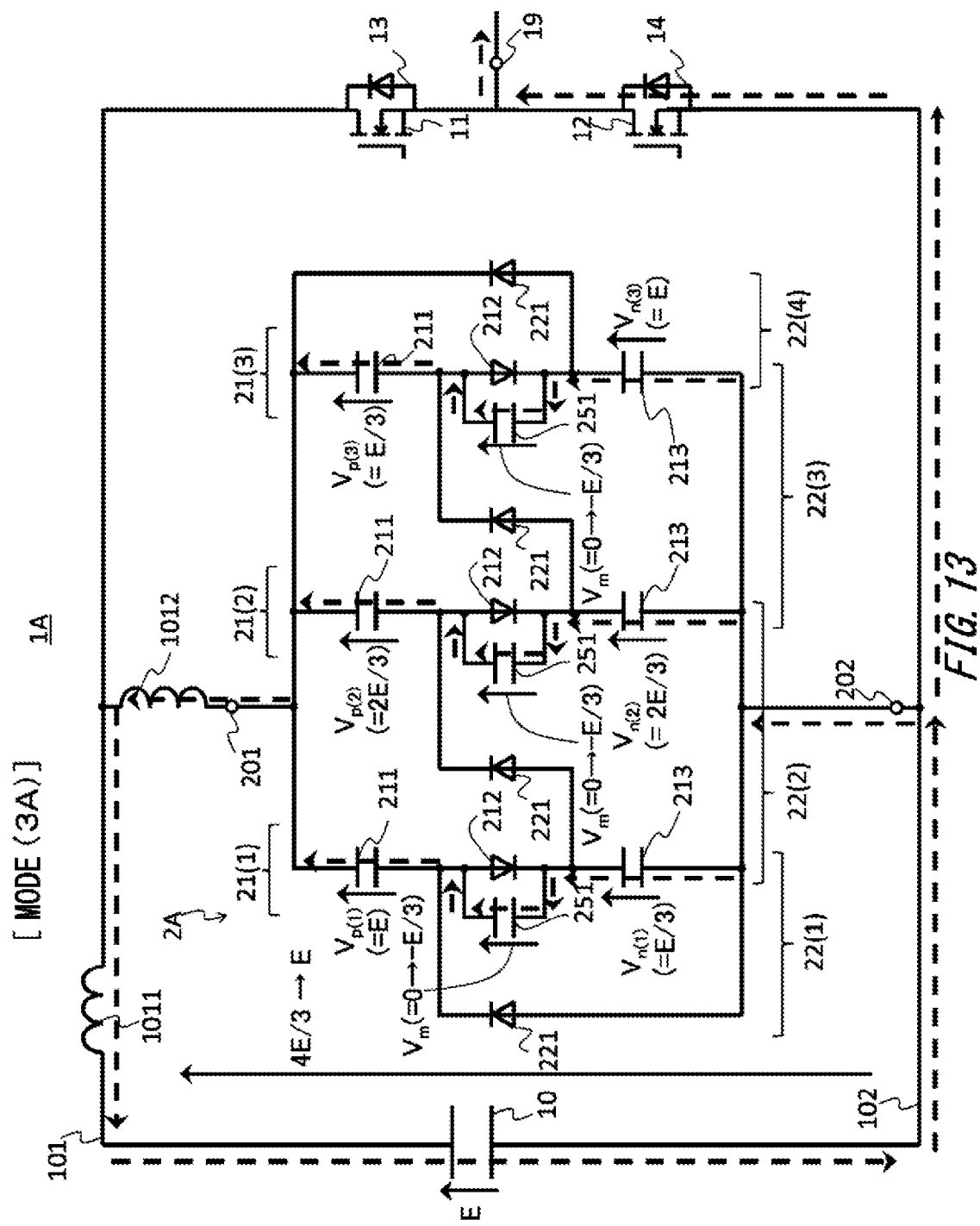
FIG. 13 shows flow of current in a mode (3A).

FIG. 13 shows flow of current in a mode (3A). When the current energy of the wire inductance 1012 is completely absorbed and the charging is thus completed, the discharging is performed via the bypass charging path because the charging voltage is equal to or higher than 4E/3(V) in the bypass charging path. In the meantime, since the capacity of each auxiliary capacitor 251 is less than the capacity of each of the positive-side capacitor 211 and the negative-side capacitor 213, the discharging may also be mainly performed from the auxiliary capacitor 251. Thereby, the voltage $V_m$ of each auxiliary capacitor 251 becomes −E/3(V), and the voltage between the positive-side wire 101 and the negative-side wire 102 is reduced from 4E/3(V) to E(V).

Figure 14:
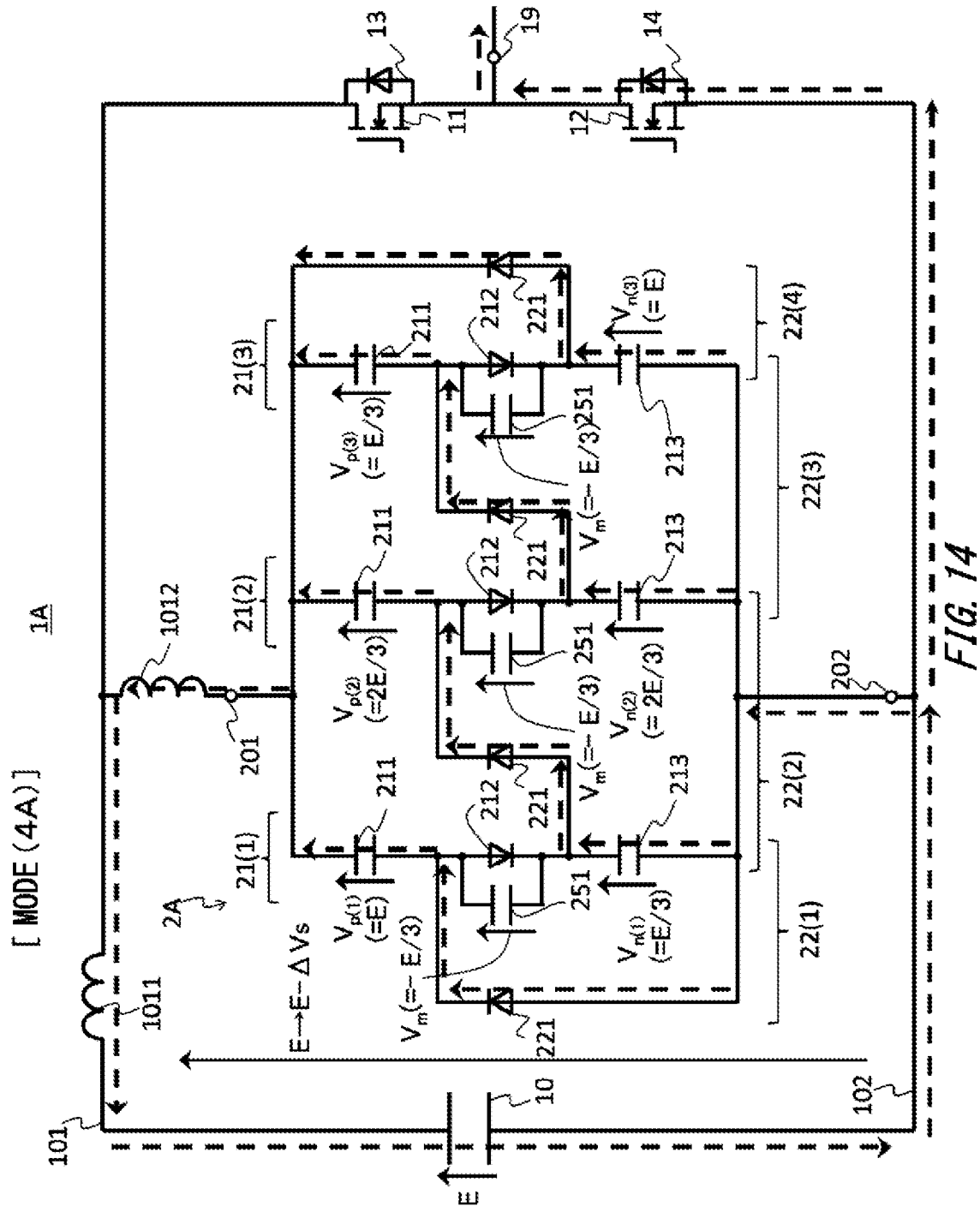
FIG. 14 shows flow of current in a mode (4A).

FIG. 14 shows flow of current in a mode (4A). When the voltage between the positive-side wire 101 and the negative-side wire 102 is reduced to E(V) and the voltage $V_m$ of the auxiliary capacitor 251 becomes −E/3(V), the current flows out from the snubber circuit 2 due to a self-inducing action of the wire inductance 1011, so that the discharging is performed from the positive-side capacitor 211 and the negative-side capacitor 213 of each discharging path 22. Thereby, the voltage between the positive-side wire 101 and the negative-side wire 102 may be reduced from E(V) to (E−AVs).

Figure 15:
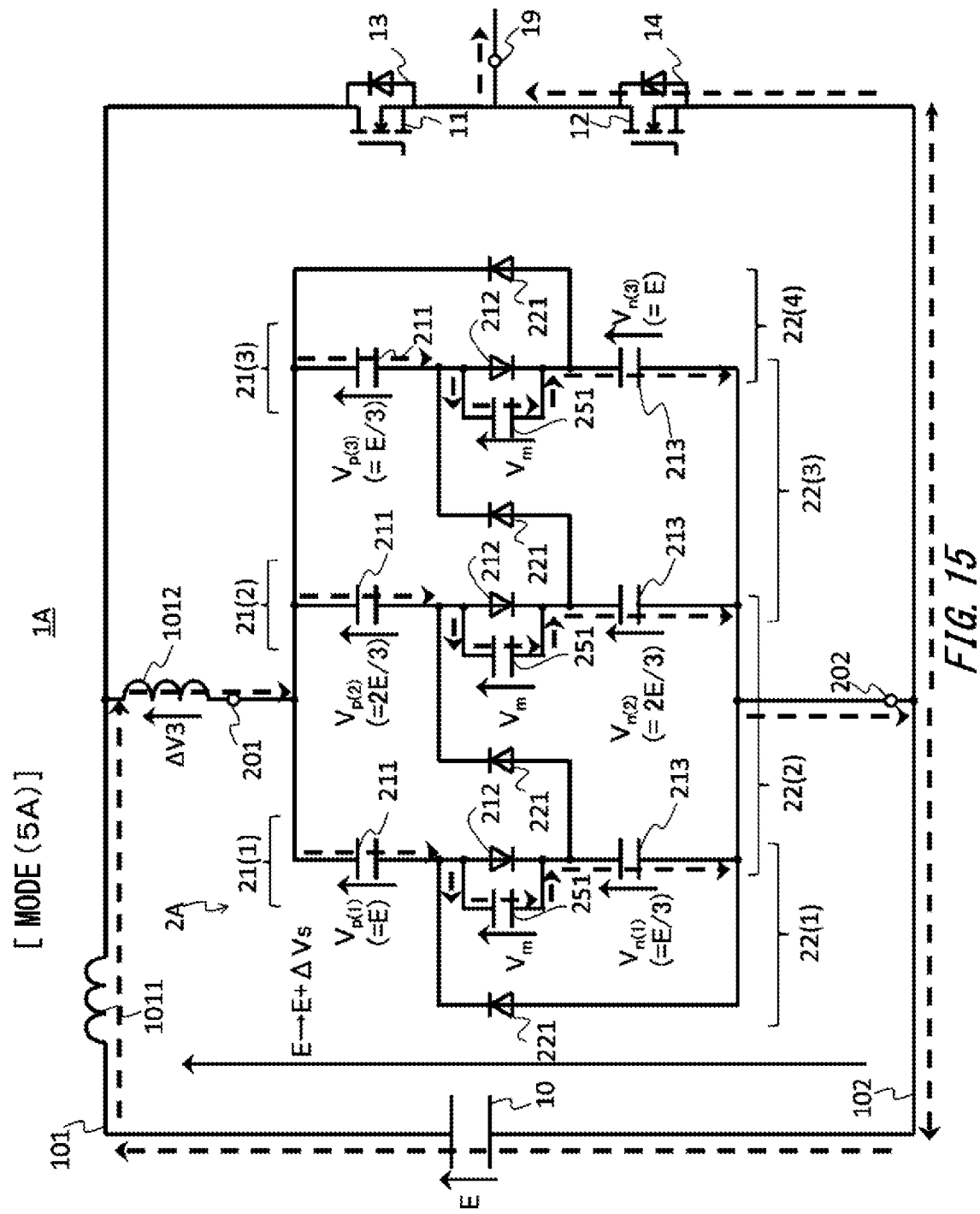
FIG. 15 shows flow of current in a mode (5A).

FIG. 15 shows flow of current in a mode (5). When the voltage between the positive-side wire 101 and the negative-side wire 102 is reduced to (E-ΔVs) by the discharging from the positive-side capacitor 211 and the negative-side capacitor 213, the current from the wire inductance 1011 again flows into each charging path 21 due to a difference from the DC electromotive force E. At this time, the charging voltage $V_m$ of each auxiliary capacitor 251 is lower than the charging voltage $V_n$ of the negative-side capacitor 213, and is −E/3 (V), for example, in the present embodiment. For this reason, the current flowing into the positive-side capacitor 211 of the charging path 21 again flows through the negative-side capacitor 213 via the auxiliary capacitor 251 without flowing through the first diode 212. Thereby, the current energy of the wire inductance 1011 is once absorbed by the charging of the positive-side capacitor 211 and the auxiliary capacitor 251.

Thereafter, the charging and discharging in the mode (2A) to the mode (5A) are repeated by resonance of the wire inductance 1011, the auxiliary capacitor 251 and the like, so that the voltage $V_m$ of the auxiliary capacitor 251 converges to substantially ΔVs/2(V). Thereby, the commutation associated with the turn-off operation of the switching element 11 is completed. The energy lost due to the resonance is about ΔVs/2(V), and may be less than the energy corresponding to E/3(V), for example.

When the switching element 11 is again turned on, as with Comparative Example, the energy during the turn-off operation accumulated in the positive-side capacitor 211 and negative-side capacitor 213 and the auxiliary capacitor 251 is released, so that the commutation associated with the turn-on operation of the switching element 11 is completed. Thereby, in the present modified embodiment, as an example, the charging voltage $V_m$ of each auxiliary capacitor 251 may become −E/3(V).

As described above, also in the snubber circuit 2A of the modified embodiment, it is possible to achieve the similar effects to the snubber circuit 2 of the embodiment.

4. Other Modified Embodiment

In the meantime, according to the embodiment and the modified embodiment, the snubber circuit 2; 2A has been described to have either the auxiliary capacitor 252 or the auxiliary capacitor 251 but may have both the auxiliary capacitors.

Also, it has been described that the auxiliary capacitors 252 are each connected in parallel to each of the (N+1) second diodes 221 but may be connected in parallel to only some of the second diodes 221. Also, it has been described that the auxiliary capacitors 251 are each connected in parallel to each of the N first diodes 212 but may be connected in parallel to only some of the first diodes 212.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: power conversion apparatus, 2: snubber circuit, 3: switch circuit, 5: semiconductor module, 10: power supply capacitor, 11: switching element, 12: switching element, 13: flywheel diode, 14: flywheel diode, 19: power supply output terminal, 21: charging path, 22: discharging path, 51: positive-side terminal, 52: negative-side terminal, 101: positive-side wire, 102: negative-side wire, 200: snubber circuit, 201: positive-side terminal, 202: negative-side terminal, 211: positive-side capacitor, 212: first diode, 213: negative-side capacitor, 221: second diode, 251: auxiliary capacitor, 252: auxiliary capacitor, 1011: wire inductance, 1012: wire inductance

What is claimed is:

1. A snubber circuit comprising:
N (N: integer equal to or greater than 1) parallel charging paths each having a positive-side capacitor, a first diode, and a negative-side capacitor sequentially connected in series between a positive-side terminal and a negative-side terminal, and configured to cause current to flow from a side of the positive-side terminal toward a side of the negative-side terminal;
(N+1) parallel discharging paths each having a second diode connected between the negative-side terminal or the negative-side capacitor of a $k^{th}$ charging path (k: integer equal to or greater than 0 and smaller than N) of the N charging paths and the positive-side capacitor of a $(k+1)^{th}$ charging path of the N charging paths or the positive-side terminal, and configured to cause current to flow from the side of the negative-side terminal toward the side of the positive-side terminal via at least one of the negative-side capacitor and the positive-side capacitor; and
at least one auxiliary capacitor each being connected in parallel to at least one of the N first diodes included on the N charging paths and the (N+1) second diodes included on the (N+1) discharging paths.

2. The snubber circuit according to claim 1, wherein a capacity of the auxiliary capacitor is less than a capacity of each positive-side capacitor and a capacity of each negative-side capacitor.

3. The snubber circuit according to claim 2, wherein the capacity of the auxiliary capacitor is 1/1000 to 1/100 of the capacity of each positive-side capacitor and the capacity of each negative-side capacitor.

4. The snubber circuit according to claim 1, wherein each auxiliary capacitor is connected in parallel to any one of the first diodes and the second diodes.

5. The snubber circuit according to claim 1, wherein each auxiliary capacitor is connected in parallel to any one of each of the N first diodes and each of the (N+1) second diodes.

6. The snubber circuit according to claim 1, wherein a wire inductance of each charging path is less than a wire inductance of each discharging path.

7. A power conversion apparatus comprising:
the snubber circuit according to claim 1; and
a switch circuit connected to the positive-side terminal and the negative-side terminal.

8. The power conversion apparatus according to claim 7, wherein the switch circuit is an inverter having upper and lower arms, and when any one of the upper and lower arms becomes non-conductive, a period $\Delta T1$ after a voltage applied to the arm reaches a power supply voltage until the voltage becomes a summed voltage of the positive-side capacitor and the negative-side capacitor in series with each other and a period $\Delta T2$ from an end of the period $\Delta T1$ to an end of charging of at least one of the positive-side capacitor and the negative-side capacitor satisfy a following relationship: $\Delta T1$ is equal to or smaller than $\Delta T2$ and $\Delta T2$ is smaller than $5 \times \Delta T1$.

* * * * *